Sept. 14, 1954   C. F. JONES   2,688,802
MACHINE MOUNTED DIAMETER GAUGE
Filed March 1, 1949   4 Sheets-Sheet 1

INVENTOR.
Cerny F. Jones,
BY
Davis, Lindsey, Hibben & Noyes
Attys.

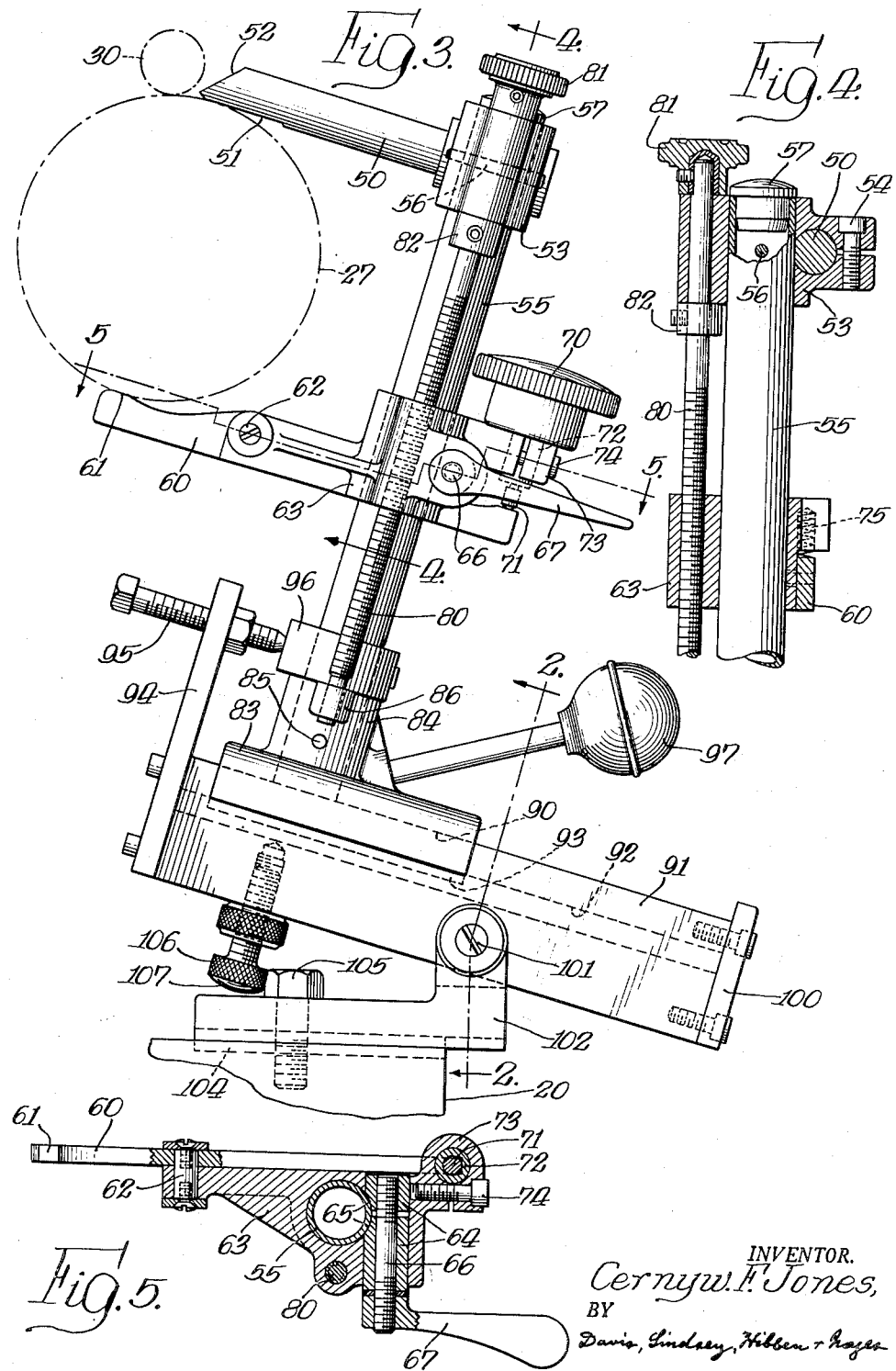

Sept. 14, 1954      C. F. JONES      2,688,802
MACHINE MOUNTED DIAMETER GAUGE
Filed March 1, 1949      4 Sheets-Sheet 3
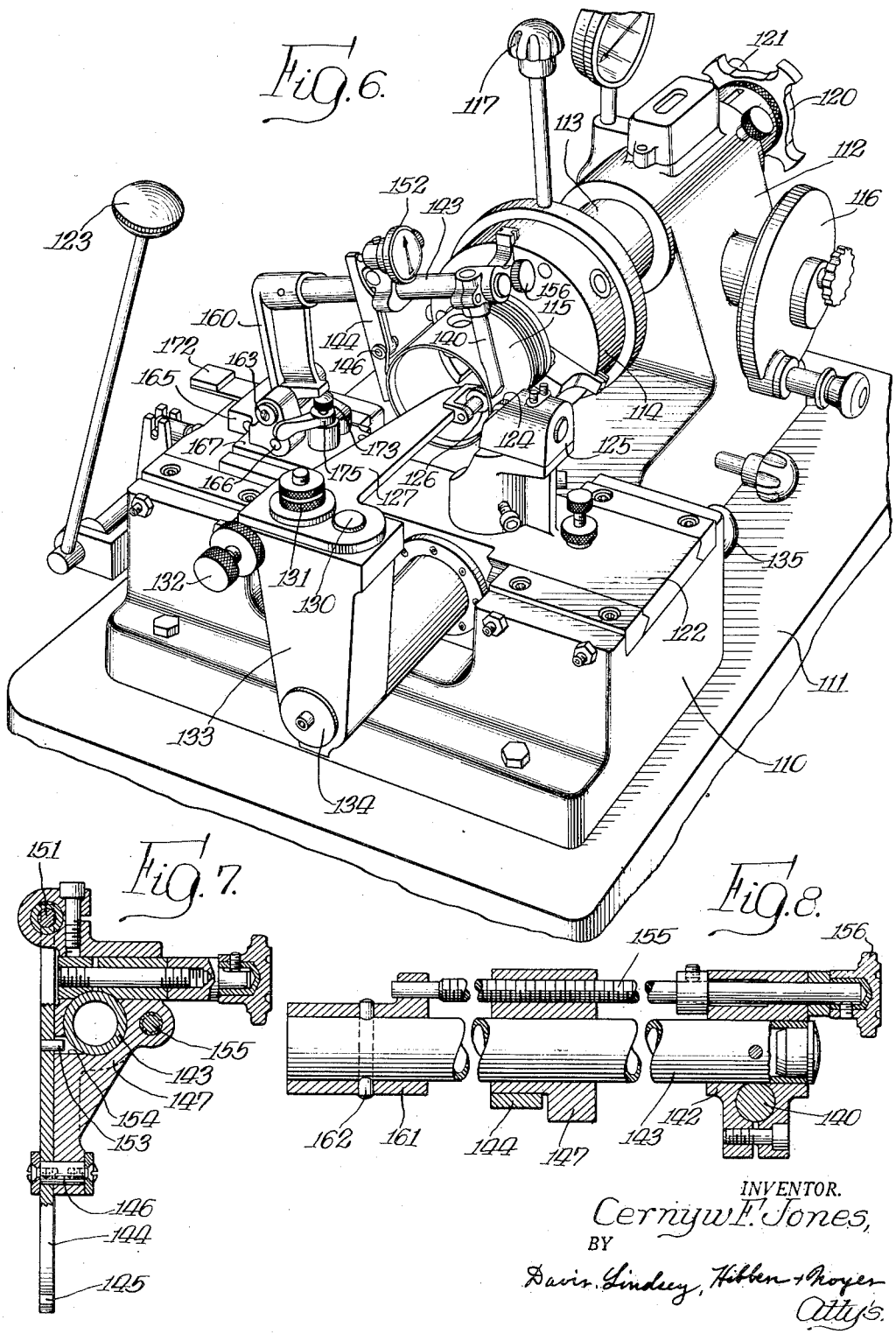
INVENTOR.
Cerny W. F. Jones,
BY
Davis, Lindsey, Hibben & Noyes
Atty's Sept. 14, 1954   C. F. JONES   2,688,802
MACHINE MOUNTED DIAMETER GAUGE
Filed March 1, 1949   4 Sheets-Sheet 4
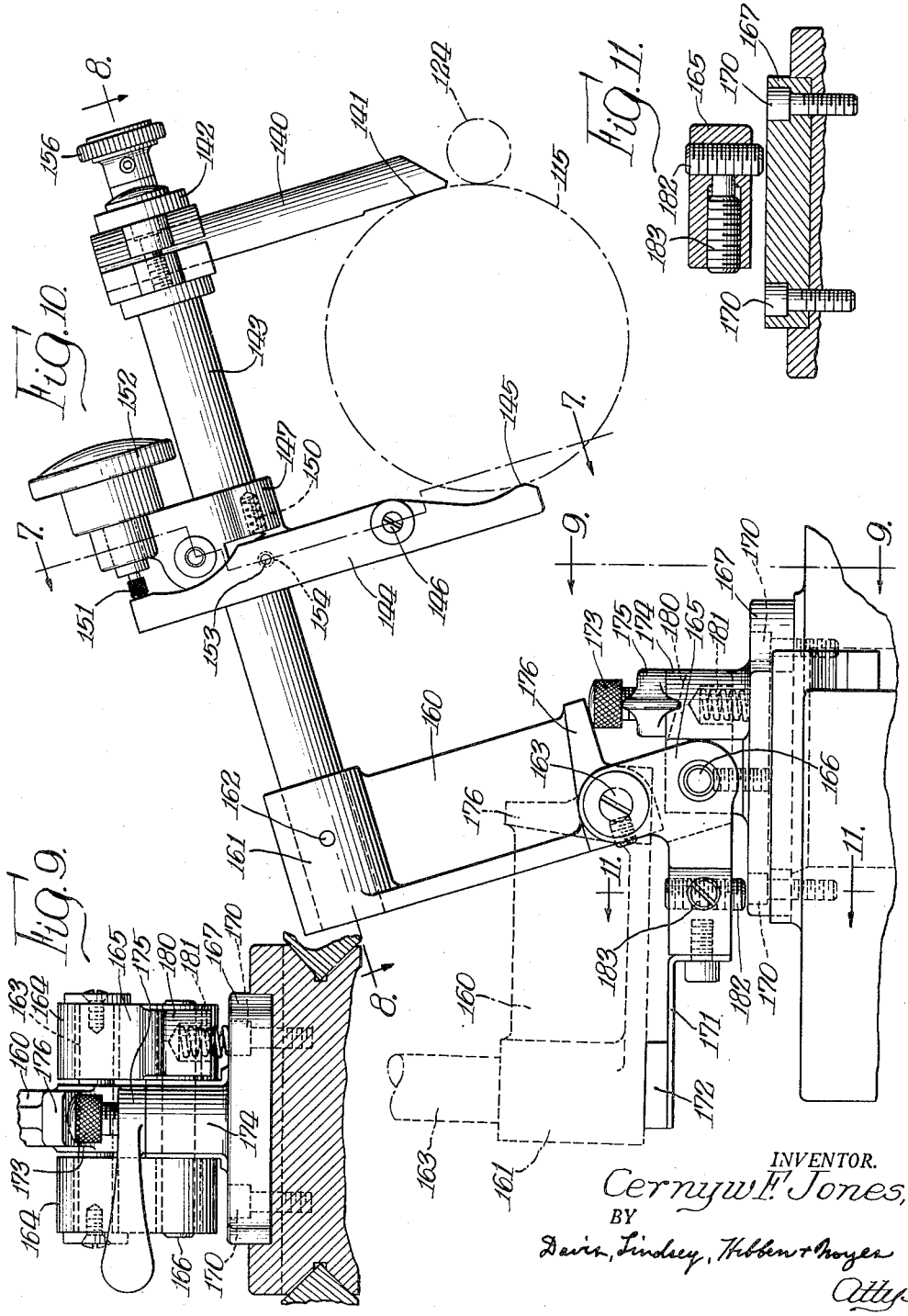
INVENTOR.
Cerny W. F. Jones,
BY
Davis, Lindsey, Hibben & Noyes
Attys.

Patented Sept. 14, 1954

2,688,802

UNITED STATES PATENT OFFICE 2,688,802

MACHINE MOUNTED DIAMETER GAUGE

Cernyw F. Jones, Economy, Ind., assignor to Perfect Circle Corporation, Hagerstown, Ind., a corporation of Indiana Application March 1, 1949, Serial No. 78,962

6 Claims. (Cl. 33—148)

The invention relates generally to gauges for measuring diameters of cylindrical objects and more particularly to a gauge of this character adapted to be mounted on a machine in which the diameters of cylindrical work pieces may be altered.

The general object of the invention is to provide a novel gauge of the foregoing character, which is adapted to be permanently mounted on the machine and may be shifted into and out of gauging position without interfering with the tool when in operating position relative to the work piece.

Another object is to provide a novel gauge of the foregoing character, which is readily adjustable for gauging work pieces of different diameters, and which is shiftable to a limited degree to accommodate work pieces that may be slightly out of round.

A further object is to provide a novel gauge of the foregoing character, which applies uniform pressures to the work pieces in the gauging operation to provide uniformity of measurement, and which includes an indicator such as a standard dial gauge for indicating the measurements taken.

Other objects and advantages will become apparent from the following description taken in connection with the accompanying drawings, in which:

Fig. 3 is a side elevational view of the gauge.

Fig. 4 is a fragmentary sectional view taken on the line 4—4 of Fig. 3.

Fig. 5 is a fragmentary sectional view taken on the line 5—5 of Fig. 3.

Fig. 6 is a perspective view of another form of knurling machine provided with a modified form of gauge.

Fig. 7 is a fragmentary sectional view taken on the line 7—7 of Fig. 10.

Fig. 8 is a fragmentary sectional view taken on the line 8—8 of Fig. 10.

Fig. 9 is a fragmentary elevational view of the gauge as viewed from the line 9—9 of Fig. 10.

Fig. 10 is a side elevational view of the gauge shown in Fig. 6.

Fig. 11 is a fragmentary sectional view taken on the line 11—11 of Fig. 10.

In the machining of cylindrical articles such as pistons for internal combustion engines or the like, control of the diameter thereof is of course essential in order that the piston may have a proper fit in the cylinder bore in which it operates. Such a piston, however, after a period of use may become so worn, particularly on the thrust faces of the skirt portion of the piston, that an excessive clearance from such faces and the cylinder bore exists. In that instance, the metal constituting the thrust faces may be mechanically worked to increase the diameter of the piston across the thrust faces to take up the excess clearance. Such mechanical working of the thrust faces may be accomplished by knurling, which places spaced indentations in the metal, thus stretching the metal and swaging the metal between the indentations outwardly so that the diameter is thereby increased. Two forms of machine for performing such a knurling operation are shown in the accompanying drawings.

Determination of the diameter of the piston across the thrust faces is necessary in order to determine the extent to which the knurling operation should be carried on any given piston, and of course only by careful control of such diameter can the correct fit of the piston in the cylinder bore be obtained. Thus, the gauge disclosed herein, in either of its specific forms, is adapted to measure the diameter of the piston while the latter is mounted in the machine and at any time during the knurling operation so that the operator of the machine can obtain accurate knowledge of the diameter at any point in the operation.

Such knurling operation on a piston has the additional advantage of producing an interrupted surface on the piston which has proved desirable in preventing excessive heating of the coacting surfaces of the cylinder bore and piston. The knurling operation may therefore be advantageously applied to new pistons as well as worn pistons. Control of the diameter of such new pistons resulting from such knurling is, of course, equally important.

While the gauge disclosed herein is illustrated in connection with a knurling machine of the above-described character and may be advantageously used with such a machine, it will be obvious that the gauge is not limited to use only with such a machine but has a broader application. Thus, it may be used in many other types of machines where the diameter of a cylindrical article is altered, either by increasing the diameter as in the case of the knurling machine, or by decreasing the diameter as in the case of a turning operation.

Figure 1:
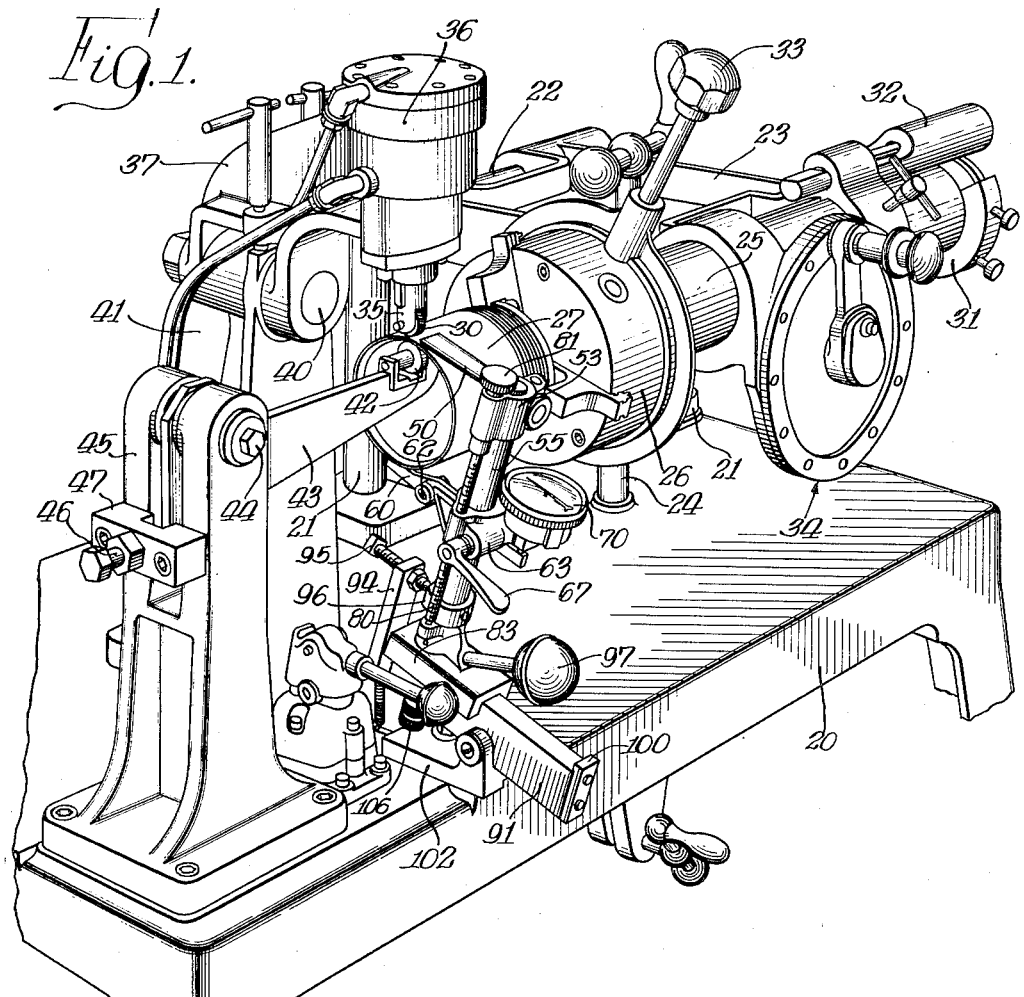
Figure 1 is a perspective view of a knurling machine for knurling the peripheral surfaces of cylindrical work pieces such as pistons for internal combustion engines or the like, to increase the diameter thereof, said machine being provided with a gauge embodying the features of the invention.
Figure 2:
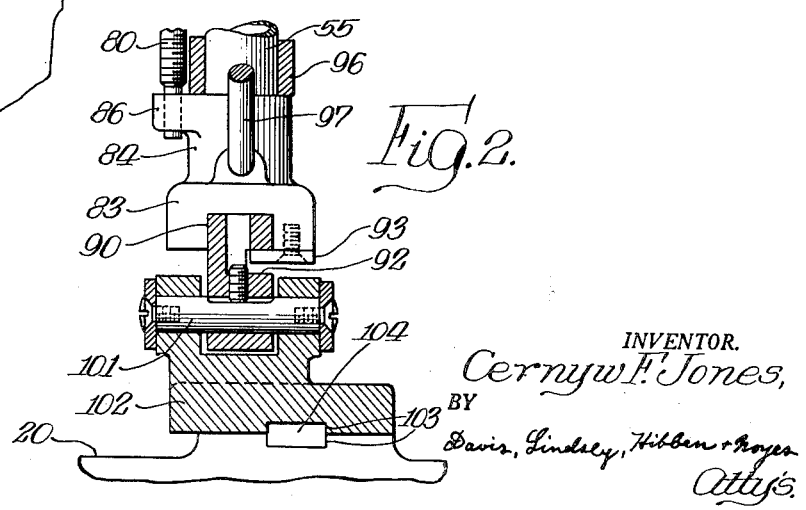
Fig. 2 is a fragmentary sectional view of the gauge, taken on the line 2—2 of Fig. 3.

To illustrate the invention, Fig. 1 shows one embodiment thereof mounted on a machine for knurling pistons for internal combustion engines. Briefly, the machine comprises a base in the form of a table 20 having a pair of uprights 21 located adjacent the rear edge of the table and supporting a pivot shaft 22 on which is mounted a work supporting frame 23. The frame 23 extends generally horizontally forward from the pivot shaft 22 and is resiliently supported in such position by an adjustable screw 24 cooperating with a spring (not shown). Slidably mounted in the front end of the frame 23 is a quill 25, in which is located a rock shaft (not shown) carrying at its left end a work supporting chuck 26. The chuck is arranged to support a piston 27 with its axis horizontal for rocking movement under a knurling roller 30. The knurling roller 30 thus is adapted to be applied to the peripheral surface of the piston 27 to produce circumferentially extending knurl tracks in the outer surface of the piston and particularly in the skirt portion thereof. The piston is so mounted in the chuck 26 that the thrust faces of the piston will be presented to the knurling roller 30 for the knurling operation.

To control the length of the knurl tracks produced on the piston 27, an adjustable collar 31 is mounted on the end of the piston supporting spindle and is provided with radial shoulders adapted to engage a bar 32 carried on the frame 23. The spindle is adapted to be rocked by means of a handle 33 rigidly secured to the chuck 26 so that engagement of the shoulders on the collar 31 with the bar 32 limits the rocking movement to the extent desired. The handle 33 is releasably connected to the chuck 26 so that after the knurling operation is performed on one thrust face of the piston, the chuck may be rotated through 180° and the handle 33 re-secured thereto for rocking the piston during knurling of the opposite thrust face. It is contemplated that a series of equally spaced knurl tracks will be placed on each thrust face of the piston, and to provide for equal spacing of such tracks, an indexing device, indicated generally at 34, is provided on the frame 23 to index the quill 25 longitudinally of the piston.

The knurling roller 30 is carried on a plunger 35 connected to a piston operating in an air cylinder 36. Thus, the knurling roller 30 may be applied to the peripheral surface of the piston 27 under a predetermined pressure to produce a knurl track on such surface when the piston is rocked by means of the handle 33. The cylinder 36 is carried on an arm 37, which is pivotally supported by means of a pivot pin 40 mounted in an upright 41, whereby the knurling roller may be accurately adjusted to contact the surface of the piston 27 squarely.

Additional support for the piston 27 directly applied to the point of application of the knurling roller 30 is provided by an anvil 42. The anvil 42 is illustrated in the form of a roller engageable with the interior of the skirt portion of the piston 27 and is carried on an arm 43 which is rigid in the direction of force applied by the knurling roller 30. To permit adjustment of the anvil roller 42 so that it may bear squarely against the interior surface of pistons, the arm 43 is pivotally supported by a pivot pin 44 carried in an upstanding bracket 45. Adjustment of the arm 43 about the pivot pin 44 may be accomplished by a screw 46 threaded in a bridge piece 47 mounted on the bracket 45 with the inner end of the screw 46 engaging the edge of a depending portion of the arm 43.

Thus, it will be noted that the piston 27 is mounted with its axis horizontal for rocking movement about its axis, and the knurling roller 30 is pressed downwardly into contact with the peripheral surface of the piston. This leaves the piston exposed at the front of the machine where the operator can readily observe the knurling operation and permits mounting a gauge for measuring the diameter of the piston, on the front of the table 20, so that such gauge may engage the piston 27 closely adjacent the point of engagement of the knurling roller 30 and permitting the latter to remain in contact with the piston 27 when a gauging operation is performed.

The gauge shown herein is of the type comprising a pair of arms adapted to embrace the piston 27 diametrically with one arm engaging the piston surface adjacent the top of the piston and preferably immediately in front of the knurling roller 30. The gauge thus may be readily observed by the operator as he stands at the front of the machine. The gauge is adapted to be permanently mounted on the table 20, but the arms thereof are so supported that they may be moved from a gauging relation with the work to an out-of-the-way position which it occupies when the piston is being rocked to perform the knurling operation.

The detailed structure of the gauge provided for the form of knurling machine shown in Fig. 1 is shown in Figs. 2-5, inclusive. This embodiment of the gauge comprises a relatively fixed gauge arm 50 in the form of a round bar having a flattened face 51 at its free end adapted to engage the piston 27. Said end of the bar 50 is also beveled, as at 52, to avoid contact with the knurling roller 30, as clearly shown in Fig. 3. The arm 50 is adapted to be clamped in a bracket 53 by means of a screw 54, and the bracket 53 is mounted in a fixed position on the upper end of a post 55. The post 55 is preferably hollow, and the bracket 53 may be rigidly secured thereto by a taper pin 56. The outer end of the post 55 is shown as being closed by a plug 57.

Cooperating with the fixed arm 50 is a movable arm 60 generally paralleling the fixed arm 50 and spaced therefrom. The arm 60 is made movable relative to the fixed arm 50 to actuate an indicator to indicate the diameter of the piston 27, the movable arm 60 also being adjustable in its spacing from the fixed arm 50 to accommodate pistons of different diameters. To this end, the movable gauge arm 60 is in the form of a bar having a work contacting surface 61, with the bar pivotally mounted by means of a pivot pin 62 on a bracket 63 carried on the post 55. The bracket 63 is adapted to be releasably clamped to the post 55 by means of a pair of collars 64 (see Fig. 5) slidably mounted in the bracket 63 and having clamping surfaces 65 engaging a portion of the post 55 when drawn toward each other by a screw 66 which may be manually rotated as by a hand lever 67.

The bracket 63, as mentioned above, also supports an indicator adapted to be actuated by the arm 60 to indicate variations in diameter of the piston 27. In the present instance, a standard dial indicator 70 is utilized for this purpose and is provided with a plunger 71 engaged by the arm 60 at its end opposite to the piston contacting end. The indicator 70 is provided with a sleeve 72 in which the plunger 71 operates, and the sleeve 72 is mounted in a split boss 73 in the bracket 63 adapted to be drawn tight about the sleeve 72 as by a screw 74. Thus, when the piston contacting surface 61 of the movable arm 60 is moved into contact with the piston 27, it will be swung about the pivot 62 to actuate the dial indicator 70 through the plunger 71. When the piston contacting surface 61 of the arm 60 is out of contact with the piston 27, it is adapted to be swung a short distance towards the fixed arm 50 by means of a spring 75 (see Fig. 4) mounted in the bracket 63 and bearing downwardly on the arm 60. The usual spring provided in the dial indicator 70, which tends to force the plunger 71 downwardly, will also tend to swing the arm 60 in the same direction. Thus, when the two arms 50 and 60 are out of contact with the work piece, they are held at a minimum distance from each other by such spring means, and when they are moved into embracing relation with the work, the arm 60 is swung about its pivot to actuate the dial indicator 70. The force exerted by the spring 75 as well as the spring in the dial indicator 70 provides for a uniform pressure of the arm 60 against the work pieces, so that accurate measurements will thereby be obtained.

The movement of the arm 60 about its pivot 62 is, of course, utilized for only minor differences in diameter of the work pieces, such as the increase in diameter effected by the knurling operation on the work piece. For pistons of substantially different diameters, the movable arm 60 may be adjusted longitudinally of the post 55 to vary the spacing between the two arms. To this end, an adjusting means is provided which, in the present instance, comprises an elongated screw 80, generally paralleling the post 55 and mounted in one of the brackets and threaded in the other. In the present instance, the screw 80 is rotatably mounted in the bracket 53 for the fixed arm 50 and is held against longitudinal movement relative to the bracket 53. To this end, a knob 81, by which the screw 80 may be operated, is rigidly secured to the upper end of the screw 80 while a collar 82 is secured to the screw adjacent the bottom face of the bracket 53. Thus, the screw 80 is held against longitudinal movement relative to the bracket but may be freely rotated therein. The screw 80 is threaded in the bracket 63 so that when the collars 64 are released from the post 55 and the knob 81 is turned, the bracket 63 for the movable arm 60 will be shifted longitudinally of the post 55. When the bracket 63 is thus adjusted to position the arm 60 suitably for a given diameter of piston, the collars 64 are again clamped to the post 55 by means of the hand lever 67.

The post 55 is supported in a manner which permits the gauge arms 50 and 60 to be moved into and out of engaging relation with the piston 27 and to properly align with the piston 27 for any position of the latter as determined by the adjustment of the frame 23 of the knurling machine. For adjustment of the arms 50 and 60 to properly align with a piston in any given position, the support for the post 55 includes a pivotal mounting, while the movement of the arms 50 and 60 into and out of gauging position is provided for in the present instance by a sliding mounting. For this purpose, the post 55, at its lower end, is rigidly mounted in a post supporting member 83 in the form of a slide. The slide 83, on its upper face, is provided with a tubular boss 84 in which the post 55 is inserted and is rigidly secured as by a pin 85. Projecting laterally from the boss 84 is a lug 86 in which the lower end of the adjusting screw 80 is rotatably received.

The lower face of the slide 83 is channeled as at 90 for slidable engagement with a cradle 91 in the form of an elongated block. The cradle 91, at one side, is provided with a longitudinally extending groove 92 (see Figs. 2 and 3) to receive a plate 93 rigidly secured on the bottom of the slide, at one side thereof, so as to retain the slide 83 on the cradle 91. It will be apparent from an inspection of Fig. 3 that the gauging arms 50 and 60 may be moved into and out of gauging relation with the piston 27 by moving the slide 83 along the cradle 91. To prevent the slide 83 from being accidentally moved off the end of the cradle 91, and to provide a fixed stop to prevent the gauging arms 50 and 60 from being moved too far over the work piece beyond the proper gauging position, a plate 94 is rigidly secured to the left end of the cradle 91, as shown in Fig. 3, with the plate 94 extending upwardly alongside the lower end of the post 55. Mounted in the upper end of the plate 94 is a stop screw 95, the end of which is adapted to engage a collar 96 mounted on the post 55 adjacent the boss 84. Thus, as the slide 83 is moved to the left as viewed in Fig. 3 to move the arms 50 and 60 into gauging relation with the piston 27, the stop screw 95 will be engaged by the collar 96 when the gauging surfaces 51 and 61 of the arms 50 and 60 are in proper gauging relation with the work piece. A handle 97 may be mounted in the slide 83 to facilitate manual movement of the slide 83 along the cradle 91.

The gauging arms 50 and 60 may be moved out of gauging relation with the work piece by movement of the slide 83 to the right as viewed in Fig. 3, along the cradle 91. When the gauging arms are remote from the work, the slide will be at the lower or right-hand end of the cradle 91, and to prevent the slide from accidentally moving off the end of the cradle, a block 100 is rigidly secured to the right-hand end of the cradle 91, and projects upwardly a short distance above the upper surface thereof so that it may be engaged by the slide 83. The block 100 thus will hold the gauge arms 50 and 60 in an out-of-the-way position relative to the work piece.

As heretofore mentioned, adjustment of the gauge arms 50 and 60 to accommodate varying positions of the work piece resulting from adjustment of the spindle supporting frame 23 of the machine is accomplished, in the present instance, by a pivotal mounting. To this end, the cradle 91 is pivotally supported by a pin 101 carried in a saddle 102 mounted on the table 20. The saddle 102 and the table 20 are shown as provided with aligned grooves 103 in which a key 104 is mounted, and the saddle 102 is rigidly clamped in place by a screw 105 threaded in the table 20. The pivot 101 for the saddle 91 is preferably located intermediate the ends of the cradle so that the slide 83, when in gauging relation with the work is positioned on one side of the pivot 101 and when moved out of gauging relation is at the other side of the pivot 101. Thus, when the gauge arms are shifted out of gauging relation with the work, the weight of the parts carried by the slide tends to hold the slide against the block 100 and to swing the cradle 91 about the pivot 101 in a clockwise direction as viewed in Fig. 3, so that the gauge cannot interfere with the work to limit the swinging movement of the cradle 91 in a counterclockwise direction as viewed in Fig. 3, whereby the fixed gauge arm 50 cannot encounter the work too far down on the front portion of the piston as it is supported in the machine. The cradle 91 carries a stop screw 106 having a rounded head 107 adapted to engage the upper surface of the saddle 102 to limit the pivotal movement in the counterclockwise direction. The screw 106 is preferably adjusted so that the rounded head 107 will engage the saddle 102 when the fixed arm 50 engages the piston 27 at a point adjacent and in front of the point at which the diameter measurement is taken by the surface 51. Thus, when the slide 83 is moved to the left to move the surface 51 of the gauge arm 50 onto the piston 27 in gauging relation therewith, the cradle 91 will be tilted slightly in a clockwise direction to lift the rounded head 107 of the screw 106 slightly off the saddle 102. The arm 50 thus bears against the work with a uniform pressure due to the weight of the parts.

In Fig. 6 of the drawings, I have shown another form of knurling machine for performing the same character of work and provided with another embodiment of the gauge, the details of this gauge being shown in Figs. 7–11, inclusive. The knurling machine shown in Fig. 6, rather than including a table, is of a so-called bench type which may be placed on a table or work bench. The machine, briefly described, comprises a base 110 which supports all portions of the machine and is adapted to be placed on a table illustrated at 111. At the right-hand end of the machine, as shown in Fig. 6, the base 110 has an upstanding bearing 112 in which is mounted a quill 113 on a horizontal axis. The quill supports a spindle (not shown) on one end of which is a chuck 114 for receiving and supporting a piston 115, the piston thus being mounted with its axis horizontal. Mounted in the upstanding bearing 112 is an indexing mechanism 116 for indexing the quill 113 longitudinally, whereby the knurl tracks placed on the piston may be equally spaced. The chuck 114 is adapted to be rocked by means of a handle 117 to move the piston 115 relative to the knurl. On the right-hand end of the spindle is mounted a collar 120 cooperating with a fixed bar 121 to limit the rocking movement of the spindle and, consequently, limiting the circumferential length of the knurl tracks.

In this machine, the knurling roller and the anvil roller for supporting the interior of the piston at the point of knurling are both carried on a slide 122. As is apparent from an inspection of Fig. 6, the slide is adapted to be moved in a forward and rearward direction. To effect such movement, a hand lever 123 is provided. The knurling roller, indicated at 124, is carried in a supporting structure 125 on the front portion of the slide, the supporting structure 125 being adjustable so that the peripheral surface of the knurling roller 124 may be placed squarely against the peripheral surface of the piston 115 and will produce an accurate circumferential knurl track thereon as the piston is rotated.

The anvil roller, indicated at 126, is adapted to engage the interior surface of the piston directly inside of the point of knurling. To this end, the anvil roller is carried on an arm 127 which is rigid in the direction of pressure applied between the anvil roller and knurling roller, but may flex to some extent in a direction tangential of the piston, should the anvil roller encounter some protruding conformation on the interior of the piston. The anvil roller arm 127 is pivotally adjustable about a pivot pin 130 so that the anvil roller 126 may engage squarely against the inner surface of the piston. A clamping screw 131 and an adjusting screw 132 are provided for effecting such angular adjustment of the arm 127 and clamping thereof in an adjusted position.

When the knurling roller 124 and the anvil roller 126 are in operative engagement with the piston, the wall of the piston is, of course, clamped therebetween. The two rollers must, of course, be moved apart a greater distance than the thickness of the piston wall when the piston is to be removed and another piston inserted. Consequently, in the present machine, the anvil roller 126 is adapted to be moved into and out of working engagement with the interior surface of the piston. To this end, the anvil supporting arm 127 is carried on a lever 133 supported by a rock shaft 134. The rock shaft 134 extends laterally from the carriage 122 and is supported thereby. To cause rocking movement of the rock shaft 134 and, consequently, move the anvil roller 126 into and out of working position, an air cylinder and a lever connection (not shown) are also carried by the carriage and are arranged in such a manner that when the air pressure is applied to the cylinder, the rock shaft 134 will be turned in a clockwise direction as viewed in Fig. 6, to shift the anvil roller into engagement with the interior surface of the piston. Since the carriage 122 is slidable, this pressure causes a slight shifting of the carriage to the extent necessary for the ridges on the knurling roller 124 to sink into the metal of the piston skirt.

In operating the machine, the operator places a piston in the chuck 114 and then, by means of the handle 123, shifts the carriage 122 so that the knurling roller 124 engages the front of the piston as shown in Fig. 6. Air under pressure is admitted to the air cylinder mounted on the carriage 122, by means of a control handle 135. The admission of such air under pressure causes rocking movement of the rock shaft 134 to move the anvil roller 126 into engagement with the interior surface of the piston. The pressure thereby exerted is sufficient to sink the knurling ridges on the knurling roller 124 partially into the exterior surface of the piston so that by rocking the hand lever 117, a circumferentially extending knurl track will be formed on the skirt portion of the piston. When pistons of different diameters are to be knurled, the carriage 122 is merely shifted by the hand lever 123 to properly position the knurling roller 124 in contact with the piston.

The modified form of gauge adapted for use with this machine is of somewhat different construction from the gauge shown for use with the machine of Fig. 1, because of the fact that the gauge in this instance is mounted on the carriage 122 and thus is shifted by movement of the carriage when the latter is adjusted for different diameters of pistons. The construction of the gauge arms in this instance and the manner in which they are mounted are generally the same as employed in the previously described gauge, but the support therefor differs in a number of respects.

The details of this modified form of gauge are shown in Figs. 7–11, inclusive. As illustrated, this gauge comprises a fixed gauge arm 140 having a piston engaging surface 141 provided at its free end. The arm 140 is adapted to be clamped in a bracket 142 rigidly secured on the end of a post 143. The movable gauge arm, indicated at 144, is provided with a cylinder engaging surface 145 and is pivotally supported, as at 146, on a bracket 147. A spring 150 mounted in the bracket 147 tends to swing the movable gauge arm 144 toward the fixed gauge arm 140 so that when the movable gauge arm 144 engages the piston, it will bear thereagainst under a constant pressure to provide for accurate gauge readings. The gauge arm 144, at its rear end, is adapted to gauge a plunger 151 of a dial indicator 152 carried by the bracket 147. Pivotal movement of the movable arm 144 is limited by means of a pin 153 secured in the arm 144 and entering a hole 154 provided in the bracket 147. The hole 154 is somewhat larger than the pin 153 so that the pin may move to a limited extent therein. However, engagement of the pin 153 with the wall of the hole 154 will obviously limit the movement of the arm 144. The movable gauge arm 144 is adapted to be adjusted longitudinally of the post 143 to accommodate pistons of different diameters. To this end, an adjusting screw 155 is rotatably mounted in the bracket 142 and is threaded into the bracket 147 with a knob 156 mounted on the end of the screw 155 for manually rotating the latter.

As mentioned heretofore, the support for the gauge, in the present embodiment, differs from the support disclosed in the previously described form. In the present instance, the post 143 is mounted in a post support member or gauge base 160. The gauge base 160 is provided with a boss 161 in which the post is inserted and secured as by a pin 162 (see Fig. 8). The base 160 is positioned, when the gauge arms 140 and 144 are in engaging relation with the piston, so that the post 143 extends upwardly and forwardly over the piston. The gauge arms thus extend downwardly onto the piston with the gauging surface 141 of the fixed arm 140 positioned slightly above the knurling roller 124. The gauge base 160, at its lower end, is pivotally supported by a pivot pin 163 mounted in a pair of spaced bosses 164 formed on a cradle 165. The cradle 165 is more or less the form of a bellcrank with one arm extending upwardly and comprising the bosses 164 and the other arm extending horizontally. The cradle 165 is also pivotally supported by means of a pivot pin 166 in a saddle 167 rigidly secured to the top of the carriage 122 of the machine, as by screws 170. The position of the base 160 and the post and gauge arms, when in gauging position, are shown in full lines in Fig. 10. However, when it is desired to move the gauge to an out-of-the-way position, the base 160 may be swung rearwardly about the pivot pin 163 to a position indicated by the dotted lines in Fig. 10. To support the gauge in such out-of-the-way position, the cradle 165, at its rear end, is provided with a spring bracket 171 provided with a resilient pad 172 on which the rear end of the boss 161 of the base 160 may rest.

Swinging the gauge forwardly about the pivot 163 moves the gauge arms 140 and 144 into embracing relation with the piston 115. To position the work engaging surfaces 141 and 145 of the gauge arms in correct position relative to the piston so that the gauge arms do not extend too far over the piston, a stop member is provided in the form of a screw 173 adjustably threaded in the saddle 167. To receive the screw, the saddle is provided with a central upstanding lug 174 adjacent its front end, which is also long enough to extend into the slot between the bosses 164 of the cradle 165 to support the pivot pin 166. The stop screw 173 is adapted to be locked in an adjusted position by means of a manually operable nut 175. As will be noted from an inspection of Fig. 10, the head of the screw 173 is adapted to be engaged by a foot portion 176 formed on the gauge base 160 when the gauge arms 140 and 144 are in proper relation to the piston.

It is desirable, as in the case of the other embodiment of the gauge, to provide for uniform pressure of the fixed gauge arm 140 against the pistons when they are measured so that accurate readings of the dial indicator 152 will be obtained. To this end, one of the bosses 164, at its lower end, is provided with a forwardly extending finger 180 in which is mounted a spring 181. The latter bears against the top face of the saddle 167 and tends to swing the cradle 165 counterclockwise, as viewed in Fig. 10, about the pivot pin 166. This tends to draw the fixed gauge arm 140 toward the left, as viewed in Fig. 10, so that the gauging surface 141 thereof will bear against the piston 115 with a constant pressure. This arrangement also provides a movement that automatically positions the gauge for any run-out of the piston skirt. To limit the extent of pivotal movement about the pin 166 that the spring 181 may produce, a set screw 182 (see Figs. 10 and 11) is mounted vertically in the rear portion of the cradle 165. The set screw 182 may be adjusted and locked in place by a second set screw 183. The set screw 182 is preferably adjusted so that, when the gauge arm 140 is in gauging contact with the piston, the lower end of the set screw 182 is raised slightly above the top surface of the saddle 167, as illustrated in Figs. 10 and 11. However, when the gauge arms are moved away from the work, the spring 181 will tilt the cradle rearwardly a slight amount until the set screw 182 engages the upper face of the saddle 167.

The modified form of gauge just described thus provides for moving the gauge arms into and out of gauging relation with the piston 115 when the latter is supported by the chuck 114. Because of the position of the arms 140 and 144, they may embrace the piston while the knurling roller 124 is in engagement therewith. Both of the arms are held in gauging relation with the work by a pressure which will be uniform for all pistons placed in the machine so that uniform and accurate results may be obtained from the readings of the dial indicator 152.

I claim:

1. A gauge for a machine of the character described, comprising a post, a pair of gauge arms carried by said post and extending laterally therefrom to embrace at diametrically opposite points a work piece carried by the machine, one of said arms being fixed on said post and the other being movable relative thereto, and a supporting structure comprising a saddle adapted to be mounted on the machine, a cradle rockably mounted on said saddle, and a post supporting member mounted on said cradle for shifting movement relative thereto to move said arms into and out of gauging relation with the work piece, the axis for the rocking movement of the cradle being so positioned relative to the work that the rocking movement causes said fixed arm, when in gauging relation with the work, to bear radially against the work with a predetermined constant pressure.

2. A gauge for a machine of the character described, comprising a post, a pair of gauge arms carried by said post and extending laterally therefrom to embrace a work piece carried by the machine, and a supporting structure comprising a saddle adapted to be rigidly secured to the machine and including a pivotal support, a cradle mounted intermediate its ends on said pivotal support, and a post supporting member mounted on said cradle for sliding movement longitudinally of the cradle cooperating with the pivotal movement of the cradle to move said arms into and out of gauging relation with the work piece, said member being positioned on one side of the pivotal support for the cradle when in gauging relation and being positioned on the other side of said pivotal support when out of gauging relation, whereby the weight of said member when moved from one position to the other tends to cause pivotal movement of the cradle.

3. A gauge according to claim 1, wherein said post supporting member is pivotally mounted on said cradle for swinging said arms into and out of gauging relation with a work piece.

4. A gauge according to claim 1, wherein said post supporting member is pivotally mounted on said cradle for swinging said arms into and out of gauging relation with a work piece, and said cradle has a resilient support engageable by said post supporting member when the arms are swung out of gauging relation.

5. A gauge according to claim 1, wherein said post supporting member is pivotally supported by said cradle for swinging said arms into and out of gauging relation with the work piece, and a spring is interposed between said cradle and said saddle tending to swing the cradle in one direction to cause said arms to engage the work piece with a predetermined pressure.

6. A gauge according to claim 1, wherein said post supporting member is pivotally mounted on said cradle for swinging said arms into and out of gauging relation with said work piece, a spring tends to swing said cradle in one direction to cause said fixed arm to engage the work piece with a predetermined pressure, and a stop limits the swinging movement of the cradle by said spring, and wherein the movable arm is pivotally supported and said post carries a spring tending to swing the pivotally supported gauge arm to cause the latter to engage the work piece with a predetermined pressure, and said post carries an indicator for actuation by the pivotally supported gauge arm.

References Cited in the file of this patent

UNITED STATES PATENTS

| Number | Name | Date |
|---|---|---|
| 1,355,724 | Zhukoff | Oct. 12, 1920 |
| 1,543,795 | Rockwell | June 30, 1925 |
| 1,571,641 | Pratt | Feb. 2, 1926 |
| 1,600,089 | Bush | Sept. 14, 1926 |
| 1,914,565 | Grothkopp | June 20, 1933 |
| 1,941,456 | Arnold | Jan. 2, 1934 |
| 1,992,606 | Darlington | Feb. 26, 1935 |
| 2,309,891 | Fisk | Feb. 2, 1943 |
| 2,325,423 | Pembroke | July 27, 1943 |
| 2,332,667 | Reed et al. | Oct. 26, 1943 |
| 2,437,783 | Hutchinson | Mar. 16, 1948 |
| 2,462,003 | Rose | Feb. 15, 1949 |
| 2,469,874 | Fetsko, Jr. | May 10, 1949 |

FOREIGN PATENTS

| Number | Country | Date |
|---|---|---|
| 278,713 | Great Britain | May 3, 1928 |